AUTOMATIC CIRCULAR GRINDING MACHINE

Filed Feb. 4, 1952 4 Sheets-Sheet 1

INVENTOR.
HELMUT G. CRÄMER
BY GEORG KOPPENWALLNER
Robert H. Jacob.
AGENT.

Jan. 20, 1953 H. G. CRÄMER ET AL 2,625,773

AUTOMATIC CIRCULAR GRINDING MACHINE

Filed Feb. 4, 1952 4 Sheets-Sheet 2

INVENTOR.
HELMUT G. CRÄMER
BY GEORG KOPPENWALLNER

Robert H. Jacob
AGENT.

Jan. 20, 1953 H. G. CRÄMER ET AL 2,625,773
AUTOMATIC CIRCULAR GRINDING MACHINE
Filed Feb. 4, 1952 4 Sheets-Sheet 3
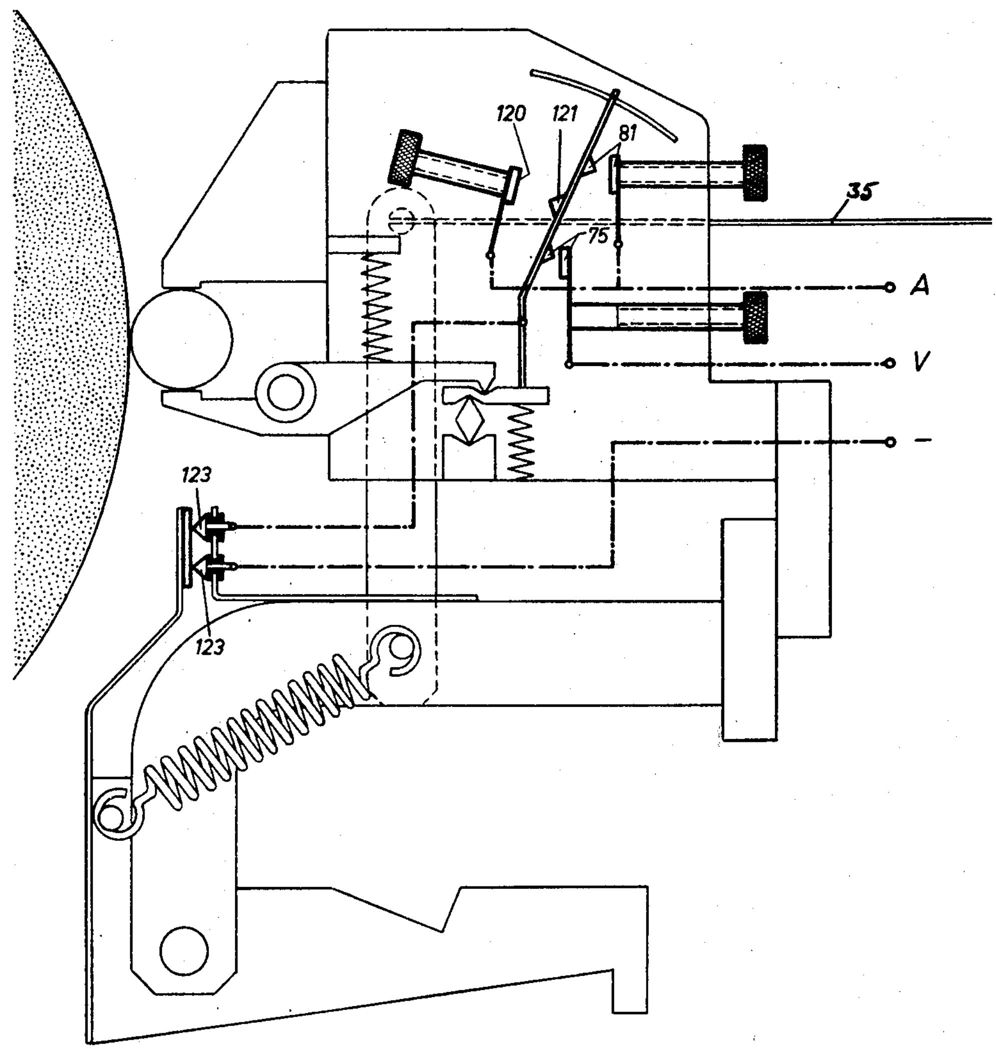
INVENTOR.
HELMUT G. CRÄMER
GEORG KOPPENWALLNER
BY
Robert H. Jacob
AGENT.

AUTOMATIC CIRCULAR GRINDING MACHINE
Filed Feb. 4, 1952 4 Sheets-Sheet 4
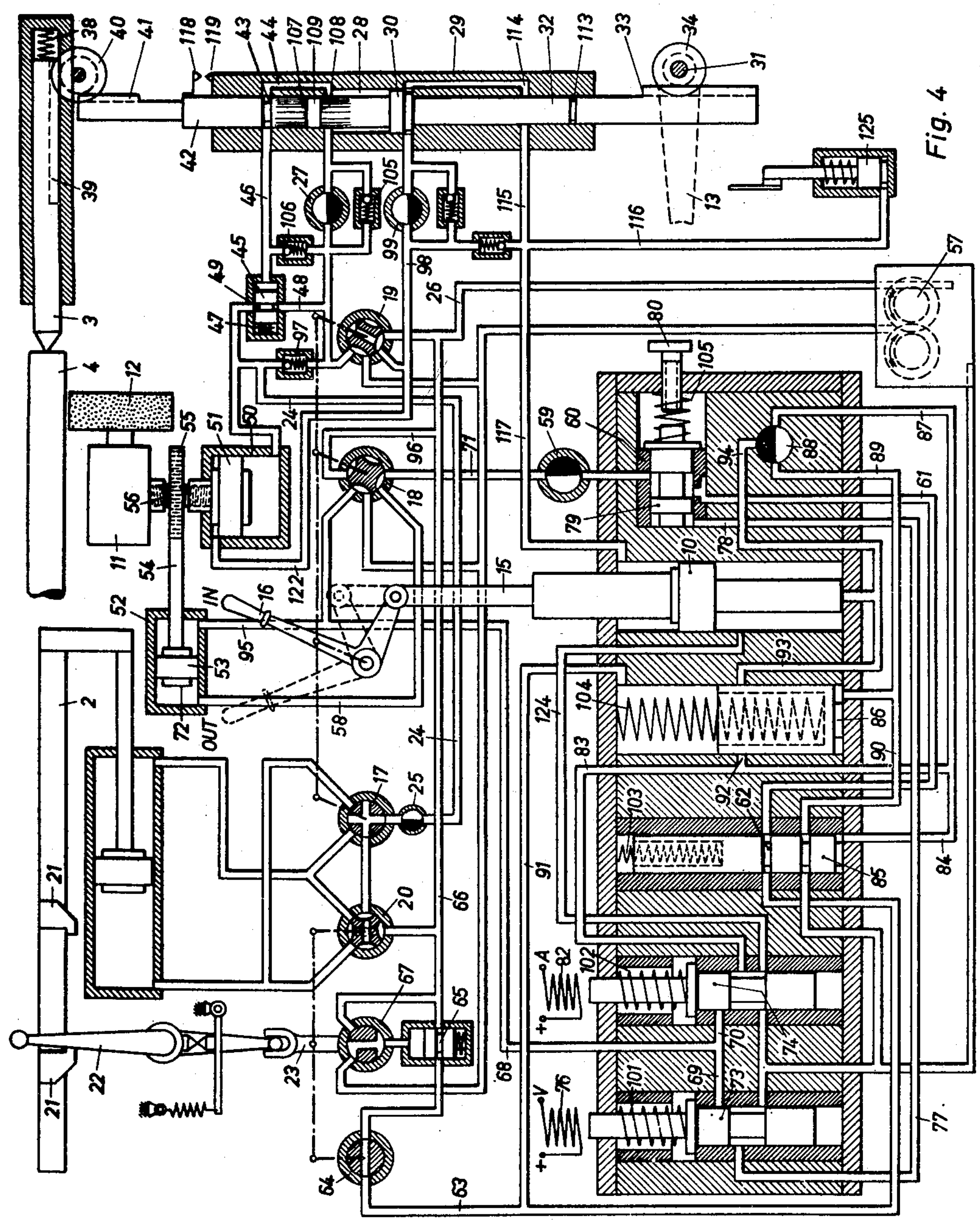
INVENTORS
HELMUT G. CRÄMER
BY GEORG KOPPENWALLNER
Robert H. Jacob.
AGENT.

Patented Jan. 20, 1953

2,625,773

UNITED STATES PATENT OFFICE 2,625,773

AUTOMATIC CIRCULAR GRINDING MACHINE

Helmut G. Crämer, Stuttgart-Degerloch, and Georg Koppenwallner, Stuttgart-Bad Cannstatt, Germany, assignors to Fortuna-Werke Spezialmaschinenfabrik A.-G., Stuttgart-Bad-Cannstatt, Germany Application February 4, 1952, Serial No. 269,772
In Germany October 20, 1949

12 Claims. (Cl. 51—165)

The invention relates to automatic circular grinding machines in which the movement of the grinding spindle carriage is controlled with electro-hydraulic means by a control impulse set off by the feeding mechanism or by a gauging and control device which scales the work blank. The subject of the invention is such installations by means of which all automatic operations for exchanging the blank which follow a definite sequence and must be guided, other than those of the grinding spindle carriage, are carried out under control of the guiding means for the grinding spindle carriage, as for example, progression or stopping of the supporting carriage, retracting and advancing of the gauging device and of the tail stock center, movement of the blank feeder, stepping of the blank supply, operation of the reversing piston for repeating the course of operations.

It has been found that the direct transfer of motion for the aforementioned additional operations from the motion of the grinding spindle carriage, for example, by cam gears, lever connections or the like, does not insure of sufficient dependability. Also a purely hydraulic transfer was not reliable. Therefore, in accordance with the invention, the driving of the parts to be controllably moved, other than the grinding spindle carriage, is effected by means of a servomotor, as for example, a guiding piston coupled to a tooth rack, gears and a control shaft, which is switched parallel to the guided drive of the grinding spindle carriage, but which delays or advances the different operations with respect to said carriage by means of devices which are known per se. In this manner the guided progression of the individual movements necessary for automatic operation of a grinding machine, which takes place independently of the carriage, but in controlled steps is obtained in the desired sequence. By employing devices which are known per se it is readily possible in accordance with the invention to have the grinding carriage return at high speed at the instant of the control impulse given by the feeding mechanism or by a gauging device and simultaneously, but with retardation, to arrange for the movement of the remaining devices to proceed in the required sequence, while at the end of this series of movements a reversing takes place and thus all operations are effected in the reverse in the corresponding sequence, until the grinding spindle carriage is again approached at the end of all intermediate movements.

A hydraulic piston is preferably used as the servomotor which, during its to and fro movement, moves a control shaft at one of its ends by means of a toothed rod and gear, whence the in and out movements of the gauging device and the arrangement for the blank feeding can be operated. By means of the other end of the hydraulic control piston the tail stock point is withdrawn, and that in such a manner, that the control piston becomes effective on the tail stock only after traveling a certain idle path by way of a displacement piston.

While this idle distance is being travelled the grinding spindle carriage moves back and the gauging device is withdrawn. This insures of a definite sequence of the individual operative steps in a manner that when the work blank has been finished to size the grinding spindle carriage and the gauging device return upon shifting of the reversing piston, whereupon the tail stock backs up, releases the finished work piece and the blank feeder moves away the completed work piece. Thereupon follows the advancing of the blank supply while the reversing piston is shifted to start a new series of operations. A new blank drops from the magazine into the pick-up of the blank feeder which moves back and places the blank into the operation position. Further backward movement of the control piston of the servomotor places the tail stock point into tensioned position and then the gauging device into gauging position. It is a further characteristic feature of the controlling arrangement that the movement of the grinding spindle carriage at high speed into operative position and the to and fro movement of the supporting carriage by the hydraulic pressure means is released for operation only when the tail stock point is tensioned; i. e. when the blank is locked into position. For this purpose a sliding valve is connected into the path of the pressure fluid to the grinding carriage cylinder, or the supporting carriage cylinder which is guided by the displacement piston of the tail stock point in such a manner that the pressure fluid flow to these cylinders is opened only when the tail stock point is in position of tension. This insures that the grinding spindle carriage and the table support cannot advance unless a blank is locked into position.

In the embodiment in accordance with the invention the fact has also been considered that it may be necessary to delay the moment at which the control impulse on the reversing piston is given by the feeder mechanism or by a gauging device upon completion of the grinding operation. This measure is necessary, first because the end of the grinding operation established in connection with an automatic switching operation which depends on a measurement, or with the release of the control impulse for the shifting does not necessarily coincide with that of the end position of the supporting carriage, which is provided for the exchange of blanks. Therefore, care must be taken that the supporting carriage will still advance into the end position, which is chosen for the exchange of blanks and stops there automatically. In addition, it is also desirable for best operating results that upon disconnecting the approach but before return of the grinding spindle carriage a certain number of carriage travels are carried out and the supporting carriage is only brought to rest at the chosen end of the stroke.

A similar delay is also desirable in connection with the so-called cutting grinding without supporting carriage movement after the tool approach is disconnected. The delay device which serves this purpose may for that reason be operated continuously as well as also under control of the movement of the supporting carriage.

Preferably the delaying arrangement comprises a hydraulic piston (delaying piston) which is put into operation by way of an adjustable valve and which opens the pressure fluid flow to the reversing piston only in its end position. In order that the reversing may take place exactly in an end position of the carriage the return oil current which is displaced out of the delaying piston is conducted through a passage which is connected with the carriage reverse control, or one of the members connected therewith, for example, the carriage reversing cock, and which during longitudinal grinding opens the pressure fluid flow only briefly during the carriage reversing operation in one end position of the table support, so that the delaying piston can reach its end position likewise only in one end position of the supporting carriage where the reverse switching takes place. The return oil passage may in this connection be controlled or guided in such a manner by means of a further control passage connected with a valve piston coupled to the table reverse cock, that the end position of the delaying piston and thus the reversing for the blank exchange is obtained only in a predetermined end position of the carriage, that which is provided for the blank exchange, while in the other end position of the carriage no switching will take place.

Furthermore, safety arrangements are provided which are intended to prevent the interruption of the operations or damage to the machine, for example, if for any reason no new blank has arrived in the operative position. It is desirable to eliminate such a defect as quickly as possible and not to wait for the advancing of the gauging device into gauging position in which, due to the lack of the blank the gauging arms are located in the end position of the measurement similarly as if the final dimension of a blank had been reached so that the control impulse for the exchange of the blank is given. Therefore, contacts are provided at the tail stock point or on a gear member connected therewith and on a machine part which is fixed with respect to the tail stock point, which make contact when the tension position is passed by and release a control impulse which indicates the defect or which initiates the operations which correspond to an exchange, or which stops the machine as soon as the tail stock point travels beyond its normal tension position owing to the absence of the blank.

Besides, a pair of contacts is arranged in the gauging device which affects a control impulse to stop the machine for exchanging the blank or to indicate such trouble as soon as the blank is of inadmissible dimensions as a result of which the machine could be damaged. The magnitude of the excess dimension which should initiate the control impulse is adjustable by means of a set screw.

An embodiment of the invention is illustrated in the attached drawings in which:

Fig. 3 shows the arrangement of the switching contacts on the gauging device, and Fig. 4 shows a diagram of the machine illustrating the condition of the switching devices after advancing of the grinding spindle at high speed and at the beginning of the coarse grinding.

Figure 1:
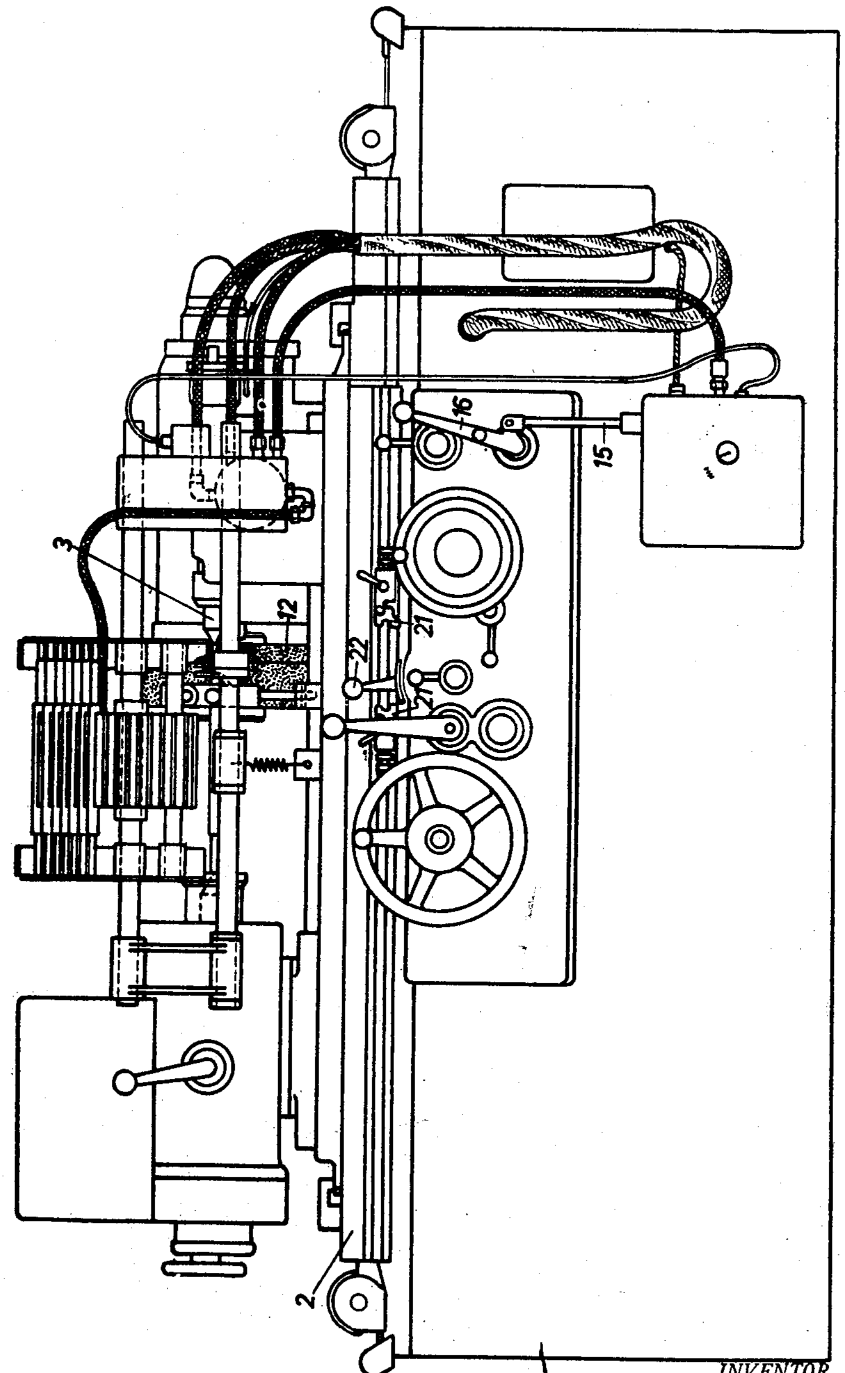
Fig. 1 shows a front elevational view of an automatic grinding machine.
Figure 2:
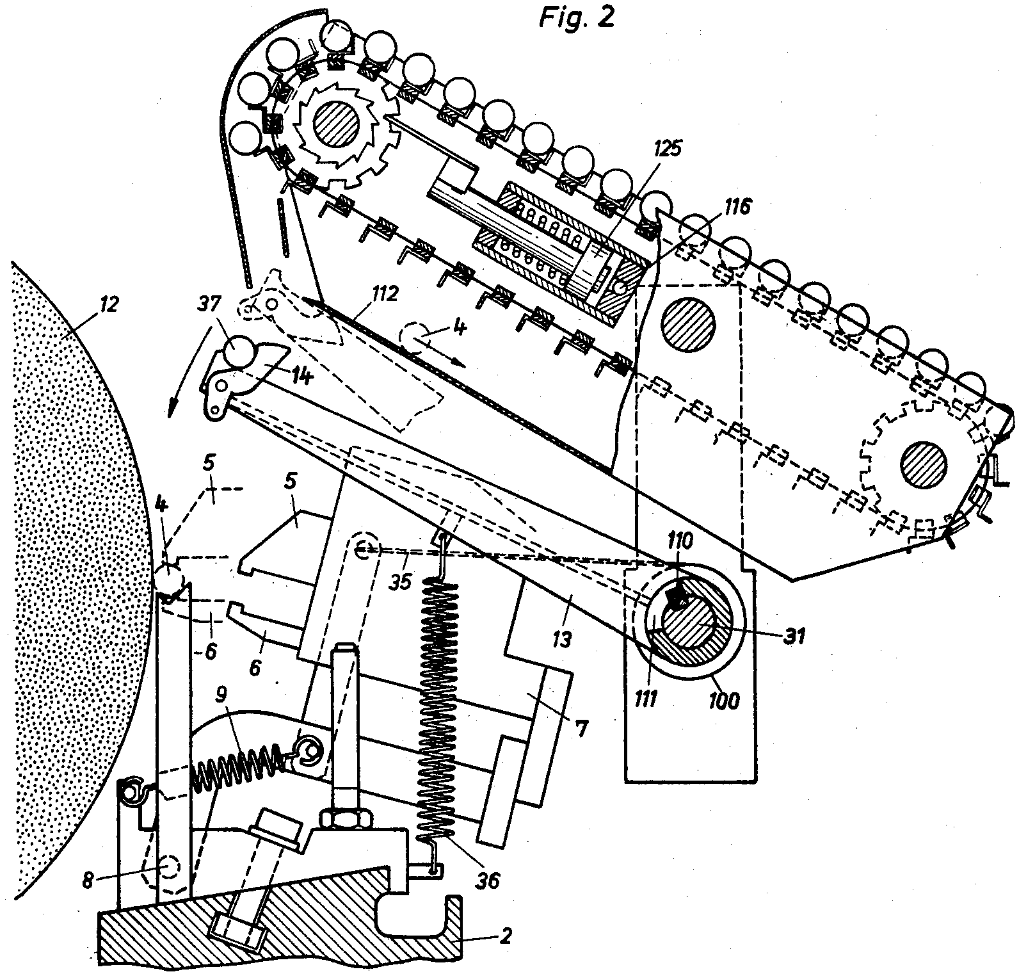
Fig. 2 shows a detail of the machine, namely the arrangement of the gauging device and of the blank feeder and of the supply box at the point shortly before switching to begin a new series of operations.

Hereinafter a grinding operation will be described for longitudinal grinding with tool approach at one end of the carriage movement with additional idle travel of the carriage without approach and reverse for the exchange of the blank at the end of travel where the approach is effected.

Upon the bed 1 of the automatic grinding machine rests a longitudinally movable supporting carriage 2 in the usual manner, which supports the blank locking means with respect to which the tail stock point 3 is arranged to be automatically movable. Between the blank locking means is located the blank 4. During grinding operation it is attached by the arms 5 and 6 of a gauging device 7 which is movably supported around a pivot 8 upon the table 2 of the machine. A spring 9 holds the gauging device in gauging position.

In the phase of the automatic operations illustrated in Fig. 4 the piston 51 has just reached its operative position at high speed in the high speed cylinder 50 and brought the grinding disc 12 closely to the blank 4. The further approach takes place at low speed by means of the approach cylinder 52, its piston 53, piston rod 54, tooth gear drive 55 and spindle drive 56.

The piston 53 is under the full pressure of the oil supplied by oil pressure pump 57 during the entire grinding operation but it can only move to the extent that the return oil can move out of the approach cylinder 52 by way of tube 58, control valve 13, tube 71 and the control devices connected thereto. It must first pass through an adjustable check valve 59 by means of which the amount of approach during the coarse grind is adjusted. In the direction of flow there is a smooth cut valve 60 which does not offer any resistance to the flow of the oil during the coarse grinding but automatically chokes the oil flow through an adjustable passage so that only a small quantity of oil can flow off and the approach is correspondingly decreased. The return oil then passes through a tube 61 to a control passage 62 by means of which the return flow is completely interrupted upon termination of the grinding operation. A duct 63 leads the return oil through passage 64 which is coupled to the carriage reverse cock 20 and which permits oil flow only briefly while in its center position during the reversing of the carriage travel.

The return oil then arrives at a lock piston 65 the piston of which normally is only under oil pressure during one travel phase of the supporting carriage against the effect of a spring thus opening the passage for the return oil by means of a control member 67 which is likewise coupled with the carriage reversing cock 20. The oil can then flow from this lock piston through duct 66 in the return duct 26 and to the sump of the pump. It is naturally possible to arrange a valve in which the input ducts to the control member 67 are exchanged or connected therewith in such a manner that the piston 65 is only under oil pressure in one or the other, or in both end positions of the carriage and opens the passage for the return oil.

During coarse grinding, duct 68 carries pressure oil which acts upon the auxiliary control valves 73 and 74 through the channels 69 and 70, but it is still closed in the position illustrated. If the desired preliminary dimension has been obtained in coarse grinding a crcuit is closed by means of two contacts 75 in the gauging device which energizes a magnet 76 so that the auxiliary control valve 73 is moved up. Pressure oil then comes from duct 69 by way of ducts 77 and 78 under the piston 79 of the smooth cut valve 60 and moves it to the position determined by the adjusting screw 80. The oil which comes from the back of the approach cylinder 52 by way of duct 58 which was able during the coarse grind to flow through the smooth cut valve 60 is thereby reduced to a correspondingly smaller amount and flows through the duct 61, control member 62 and duct 63 as already described above. Now the fine grinding operation begins.

When the final dimension has been arrived at during the fine grinding a second circuit is closed in the measuring device by means of two contacts 81 which energizes the magnet 82 so that the auxiliary control slide valve 74 is attracted by it. Pressure oil arrives under the reversing slide 85 through duct 70 by way of ducts 83 and 84, places it in its cut off position in which the control slot 62 for the return oil of the approach cylinder is cut off so that the approaching is stopped; the pressure oil, furthermore, reaches the retarding piston 86 by way of duct 92 where it is first prevented from entering. Finally the pressure oil arrives at the check valve 88 through duct 87 whence it gets under the retarding piston 86 through duct 89 and to the reversing slide 85 by way of duct 90 where at first it cannot proceed. The oil above the delaying piston 86 passes through duct 91 into duct 63 through the control slot 64, locking piston 65, duct 66 and flows off in the same manner as the return oil of the approaching cylinder. Thus the retarding piston can move intermittently only at one end of the travel of the supporting carriage or steadily during the cutting grinding operation.

When the retarding piston 86 has reached its extreme position upon execution of a number of strokes of the supporting carriage 2, as determined by the adjustment of the control valve 88, the pressure fluid enters under the switching piston 10 through tubes 92 and 93 and pushes it quickly into its cut off position. If the delayed cut out or switching operation is to be omitted the control valve 88 is adjusted in such a manner as to supply the pressure oil directly under the switching piston 10 through tube 94.

The switching piston 10 is connected by means of piston rod 15 to angle lever 16, which, in turn is coupled to a cut-off cock 17 for the travel of the supporting carriage 2, a control cock 18 for the approach of the grinding spindle carriage 11 and a control cock 19 for the advancing of the carriage at high speed. All the cocks 17, 18 and 19 are simultaneously shifted during the switching. The table support or supporting carriage 2 stands still, the side 72 of the piston 53 which previously constituted the back side is supplied with pressure oil, the approaching arrangement returns while the return oil flows to the sump of the pump from the front of the approaching piston 53 through duct 95, control cock 18 and duct 96 and the previous back side of the high speed piston 51 is also supplied with pressure oil through duct 122. The return oil from the front of the high speed piston 51 flows also into the sump of the pump by way of a check valve 97 and control cock 19. At the same time the operation of the servomotor 29 begins. Pressure oil is fed under piston 30 by way of duct 98 and an adjustable choke valve 99 by which the movement of the high speed piston 51 and piston 30 of the servomotor 29 are coordinated, and the piston moves in the direction of the tail stock point 3. A piston rod 32, is rigidly connected to piston 30, carrying a toothed rack 33 at one end, which turns a control shaft 31 by way of a gear 34. A roller 100 is secured to the control shaft.

As the control shaft 31 is turned the gauging device is pulled back by a pulley arrangement 35. As the withdrawing of the gauging device begins the circuits for the magnets of the auxiliary control slide valves are interrupted at the contact 123, so that the auxiliary slide valves 73 and 74 are returned to their initial positions by springs 101 and 102. Also returned to their initial positions are reversing valve 85 by spring 103, retarding piston 86 by spring 104 and the piston 79 of the smooth cut valve 60 by spring 105. Since all ducts in the control block in which these elements are brought together are now without pressure the oil quantities displaced by the control elements can flow into the sump through ducts 124, 84, 83, by way of auxiliary slide valve 74, duct 78 by way of auxiliary slide valve 73, and through duct 90 by way of reversing valve 85. This does not cause any switching operations in the control block. The oil quantities present and displaced in the cylinder 28 of the servomotor can flow off through check valve 105, while the oil in front of the locking piston 45 can flow through check valve 106 and control cock 19. The piston 45 moves into locking position under the influence of spring 47 and bars the passage from control cock 19 to high speed cylinder 50.

The tail stock point 3 is pressed against the blank 4 by spring 38 in a known manner. It is provided with teeth 39 which are connected to the gear rack 41 at the extension of a piston 42 by way of a gear 40 which is guided concentrically with piston 30 of the servomotor. Between the front planes 107 and 108 of the two pistons 42 and 30 a space 109 is provided as indicated in the position illustrated. Only after this space 109 has been traversed by the continued movement of the piston 30 and the two front planes 107 and 108 contact each other displacement of piston 42 takes place pulling back the tail stock point 3 by way of gears 41, 40 and 39 against the tension of spring 38 freeing the blank to be exchanged. At that instant the catch 110 of the control shaft 31 has traveled the space 111 in the cut out portion of feeder lever 13 and the blank 4 is removed. In the extreme position of the feeder lever 13 a retaining claw 14 opens upon contact with the oblique plane 112 and the completed work piece 4 slides over this oblique plane into a collecting box. In the position of the piston 30 which corresponds to this position of the feeder lever 13 a groove 113 on the piston rod 32 connects a control duct 114 in the servomotor with a duct 115. The duct 115 which now carries pressure oil supplies the piston 125 by way of duct 116 for stepping up the blank supply. A new blank 37 drops into the feeding claw 14 of the lever 13. Simultaneously the reversing piston 10 is supplied through duct 117 and consequently is again brought into the "In" position. The reversing piston simultaneously switches the angle lever 16 and accordingly also control cocks 17, 18 and 19 to the "In" position. No movement of the table support or of the grinding spindle carriage takes place at this time because the fluid passage to the two cylinders is still locked. Pressure oil first gets into the cylinder space 28 of the servomotor 29 only by way of control cock 19 through an adjustable choke 27 and moves the piston 30 again in the direction of the control shaft 31. The tooth gear 33 at the end of the piston rod 32 of piston 30 moves the control shaft 31 by means of toothed gear 34 into the initial position while the feeder lever with the new blank is returned by the pressure of spring 36.

As soon as the blank has attained its operating position and as the piston 30 moves farther back the tail stock point 3 again moves into tensioned position under the force from spring 38. During the last portion of the movement of piston 30 through the space 109 to its starting position also the gauging device is returned to gauging position by spring 9. Only in this gauging position the electrical circuit, which had been interrupted at contacts 123 as the withdrawing of the gauging device started, is conditioned for supplying impulses. However, no impulse is given as yet because the circuit is still interrupted at the contacts of the gauging arms. Simultaneously the tensioned position of the tail stock point is attained and groove 43 around piston 42 establishes a connection between a control duct 44 in the servomotor 29 and a duct 46 which leads in front of the locking piston 45 so that this piston is displaced against the pressure of a spring 47 and as a result fluid pressure reaches the high speed cylinder 50 from duct 48 via groove 49 in the lock piston 45 and the piston 51 moves the grinding spindle carriage 11 at high speed into operating position.

Simultaneously, the carriage movement begins within the limits of the carriage speed adjusted by means of the carriage control 25. Only now the new operation of the coarse grinding begins. The slide reversal is started by means of handles 21 which shift the carriage levers cock by means of a hand lever 22 and a forked lever 23. If the hand lever 22 is set in its center position the machine is ready for cutting grinding operations.

If the tail stock 3 should move beyond its position of tension in the absence of a blank a circuit is closed between the tail stock point and the associated gear by contacts 118 and 119 which produces an impulse for magnet 82 of the auxiliary control valve 74 and initiates a shifting operation simulating the exchange of the blank or it stops the machine and operates a signalling device. If, however, the new blank has inadmissible dimensions the arms 5 and 6 of the gauging device 7 are separated beyond the normal extent and two contacts 120 and 121 also release an impulse for the blank exchanging operation or for stopping the machine, or for operating a signalling device.

We claim:

1. In an automatic grinding machine including a table carriage, a grinding disc carriage, a rapid approach mechanism including a piston and cylinder connected to move said grinding disc carriage, a movably mounted blank feeding means, a tail stock having a movable center, a movably mounted blank gauging means including contacts or the like capable of emitting control impulses, a control means adapted to coordinate the operation of the machine including a reversing piston connected to said rapid approach mechanism and control valves actuated in response to said impulses to apply pressure to said reversing piston, a servomotor comprising a cylinder housing a first piston connected to move said gauge means and blank feeding means into and out of operative position and a second piston disposed adjacent said first piston and spaced therefrom and connected to move said tail stock center.

2. Control means for a grinding machine in accordance with claim 1, wherein said cylinder and piston for moving said grinding disk carriage are connected with the cylinder of said servomotor by pressure conduits including choke valves and check valves connected parallel thereto and a lock piston having a groove.

3. Control means for a grinding machine in accordance with claim 1, including a shaft pivotally supporting said blank gauging means, a rack carried by said first piston, a control shaft supporting a pulley and having operative engagement with said rack, a chain extending between said pulley and said gauging means adapted to withdraw said gauging means and a spring extending between said gauging means and the support therefor adapted to pull said gauging means into operative position.

4. Control means for a grinding machine in accordance with claim 1, wherein said tail stock includes a biasing spring and said second piston in said servomotor includes a rod and rack in operative engagement with a gear having engagement with a rack associated with said tail stock center, whereby said second piston is adapted to move said tail stock center against the action of said spring upon said first piston traversing said space between said pistons.

5. Control means for a grinding machine in accordance with claim 1, wherein said tail stock includes a biasing spring and said second piston in said servomotor includes a rod and rack in operative engagement with a gear having engagement with a rack associated with said tail stock center, whereby said second piston is adapted to move said tail stock center against the action of said spring upon said first piston traversing said space between said pistons, and said blank feeding means is rotatably mounted upon a control shaft including a detent and a gear in operative engagement with said first piston and is adapted to permit idle travel of said detent and to be carried along by said detent upon covering an idle path greater than the space between said first piston and said second piston.

6. Control means for a grinding machine in accordance with claim 1 comprising in association with said first piston in said servomotor a piston rod having a groove, and pressure conduit means in alignment with said groove while said second piston is in tail stock withdrawal position, said conduit being associated with a piston and a cylinder capable of advancing a work blank and with the actuating side of said reversing piston.

7. Control means for a grinding machine in accordance with claim 1, wherein said gauging device includes adjustable contacts, adapted to touch and emit control impulses in response to the members of said gauging device being extended beyond predetermined limits by a working blank.

8. Control means for a grinding machine in accordance with claim 1 comprising a pair of switching contacts operatively associated with the tail stock center and adapted to touch and emit an impulse in the absence of a blank, thereby indicating the defect.

9. Control means for a grinding machine in accordance with claim 1, comprising a pair of switching contacts operatively associated with the tail stock center and adapted to touch and emit an impulse in the absence of a blank, thereby operating the reversing piston and introducing a new work blank.

10. Control means for a grinding machine in accordance with claim 1 including means adapted to emit a control impulse adapted by way of magnets and auxiliary control valves to release pressure upon said reversing piston, a delaying piston adapted by way of an adjustable choke to share and respond to said pressure, control passages in the cylinder of said delaying piston disposed to open said passages in the extreme position of said delaying piston and permitting free flow of pressure fluid to said reversing piston.

11. Control means for a grinding machine in accordance with claim 1 including a delaying piston and cylinder, a first control member adapted to reverse the movement of the table carriage associated with a hand lever and a forked lever operated by arms on said carriage, a second control member adapted to regulate the flow of pressure fluid displaced by said delaying piston, said second control member being operated by said first control member in a manner that during longitudinal grinding the control passage for the fluid return flow is open in the end positions of the table carriage, thereby permitting movement of said delaying piston in the said end positions.

12. Control means for a grinding machine in accordance with claim 1 including a delaying piston and cylinder, a first control member adapted to reverse the movement of the table carriage and associated with a hand lever and a forked lever operated by arms on said carriage, a second control member adapted to regulate the flow of pressure fluid displaced by said delaying piston and a third control member adapted to determine the position of a lock piston having a control passage for fluid return flow associated with one end position of said table carriage thereby permitting movement of said delaying piston only in said one end position of said table carriage.

HELMUT G. CRÄMER.
GEORG KOPPENWALLNER.

REFERENCES CITED

The following references are of record in the file of this patent:

UNITED STATES PATENTS

| Number | Name | Date |
| --- | --- | --- |
| 1,997,551 | Romaine | Apr. 9, 1935 |
| 2,117,917 | Silven | May 17, 1938 |
| 2,150,749 | Price et al. | Mar. 14, 1939 |
| 2,183,490 | Flygare | Dec. 12, 1939 |
| 2,229,312 | Silven et al. | Jan. 21, 1941 |
| 2,335,356 | Price et al. | Nov. 30, 1943 |
| 2,453,678 | Silven | Nov. 9, 1948 |

FOREIGN PATENTS

| Number | Country | Date |
| --- | --- | --- |
| 523,199 | Great Britain | July 9, 1940 |